United States Patent [19]

Heemskerk

[11] Patent Number: 5,088,959
[45] Date of Patent: Feb. 18, 1992

[54] METHOD FOR CAUSING SITTING POULTRY TO STAND UP AND APPARATUS FOR CARRYING OUT THIS METHOD

[75] Inventor: Wilhelmus J. C. Heemskerk, Leiderdorp, Netherlands

[73] Assignee: Meyn Machinefabriek B.V., Netherlands

[21] Appl. No.: 377,553

[22] Filed: Jul. 10, 1989

[30] Foreign Application Priority Data

Aug. 8, 1988 [NL] Netherlands ............................ 8801969

[51] Int. Cl.⁵ ............................................. A22C 21/00
[52] U.S. Cl. ........................................ 452/183; 119/159; 198/493
[58] Field of Search .................... 17/11, 51; 119/159, 119/156; 198/495, 499, 494; 452/177, 178, 179, 182

[56] References Cited

U.S. PATENT DOCUMENTS

| | | | |
|---|---|---|---|
| 1,230,843 | 6/1917 | Bird | 119/159 |
| 1,235,027 | 7/1917 | Harrison | 198/495 |
| 1,303,851 | 5/1919 | Carlson | 119/159 |
| 2,168,419 | 8/1939 | Paterson | 198/493 |
| 3,564,645 | 2/1971 | Brugman | 17/11 |
| 3,702,017 | 11/1972 | Lewis | 17/11 |
| 3,828,397 | 8/1974 | Harben, Jr. | 17/11 |
| 4,185,581 | 1/1980 | Tilton | 119/159 |

Primary Examiner—Willis Little
Attorney, Agent, or Firm—Dority & Manning

[57] ABSTRACT

For causing sitting poultry to stand up its abdomen is brought into contact with a liquid or is a gas stream blown against the abdomen. An apparatus for carrying out this method comprises a spraying unit for the liquid or a blowing nozzle for the gas stream.

16 Claims, 1 Drawing Sheet

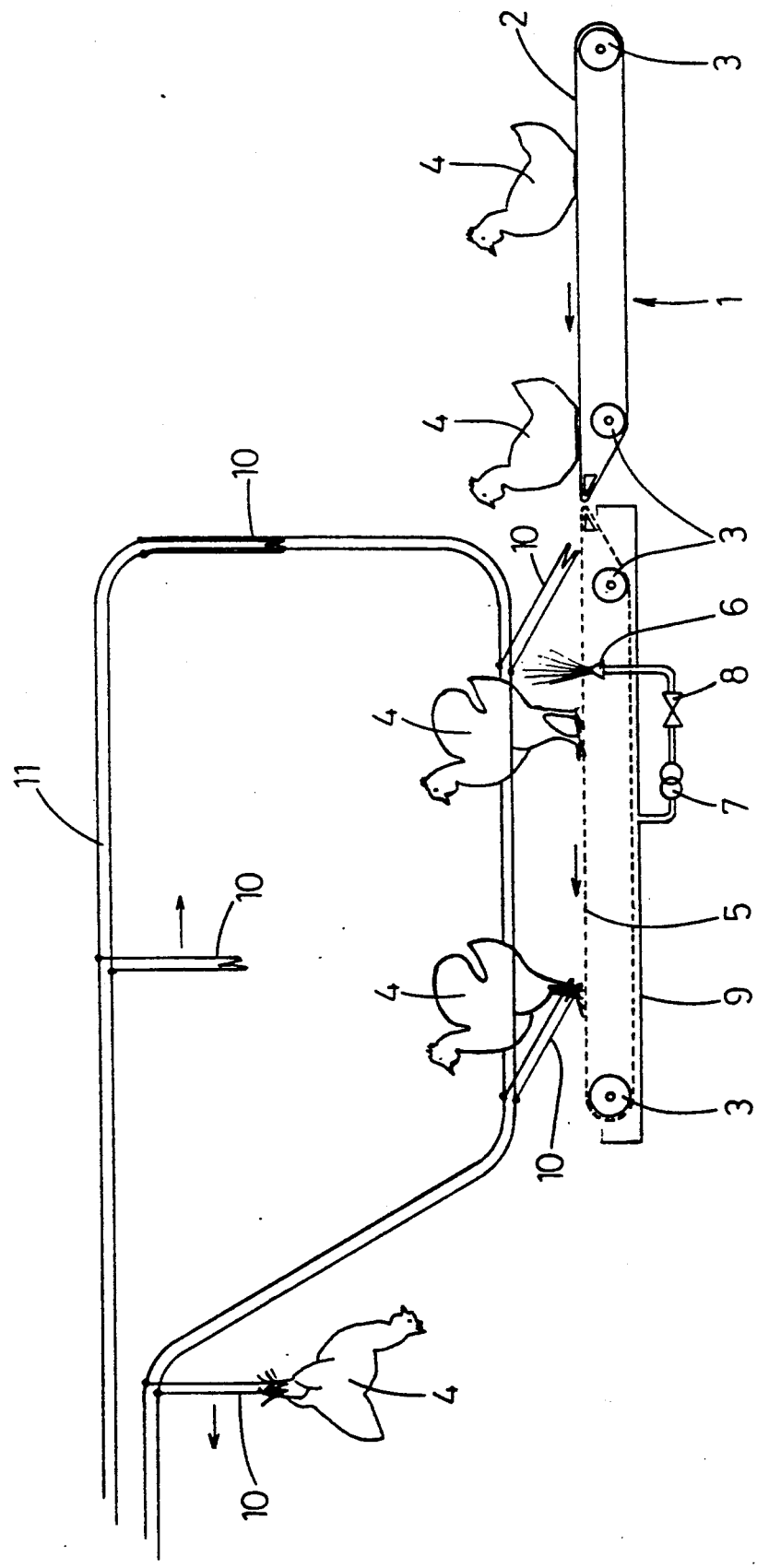

METHOD FOR CAUSING SITTING POULTRY TO STAND UP AND APPARATUS FOR CARRYING OUT THIS METHOD

The invention relates to a method for causing sitting poultry to stand up.

In the modern poultry processing industry generally an assembly line processing is carried out in which the birds are suspended with their legs in correspondingly shaped transportation shackles of a suspension conveyor. Presently suspending the birds in the transportation shackles is carried out manually; at the present high processing rates this is very strenuous labour, besides of being monotonous and soul-killing. Therefore, one desires to automatize suspending the birds in the transportation shackles.

Such an automation can be obtained by gripping the legs of the birds from behind by means of the transportation shackles of the suspension conveyor which at that time slide over the ground. However, it is necessary then that at the very moment of engagement the birds are standing up.

When supplying poultry alive one can observe that the greater part of the poultry is sitting down, such that a correct engagement of the transportation shackles is nearly impossible. Therefore, there is a need for causing the birds to stand up on their legs just before the moment of engagement of the transportation shackles. However, also for other processing steps or actions it may be necessary that the birds are standing up.

In the past already attempts have been made for causing poultry to stand up. Some solutions (such as vibrating the supporting plane) did not appear to be very effective, whereas other solutions, such as shortly electrically charging the supporting plane, are very animal unkind and therefore cannot be considered for application.

Thus, it is an object of the invention to provide a method for causing poultry to stand up which is very effective and which can be applied without objections.

Thus, in the method according to the invention the abdomen of the poultry is brought into contact with a liquid.

Surprisingly it appeared that sitting poultry will stand up immediately if its abdomen is brought into contact with a liquid. The response is very large, such that no or hardly any bird remains sitting.

The method according to the invention is especially then very effective, if the liquid is sprayed against the abdomen of the poultry. In this way with a minimal amount of liquid a maximum effect can be obtained.

Another possibility provides that the poultry is led through a shallow liquid basin. At the moment that the abdomen of the poultry contacts the liquid surface the bird will immediately stand up.

According to a handy embodiment of the method according to the invention the liquid comprises water.

Further there is the possibility that a gas stream, such as air, is blown against the abdomen of the poultry. Thus in this case the liquid is replaced by a gas stream.

The invention further relates to an apparatus for carrying out the method according to the invention.

Therefore, this apparatus comprises a supply unit for supplying the poultry and a spraying unit or blowing nozzle, respectively, positioned in the close vicinity of the supply unit for spraying the liquid or blowing the gas stream, respectively, against the abdomen of the poultry sitting on the supply unit.

For minimizing the use of liquid it can be advantageous if below the spraying unit a liquid collecting reservoir is positioned for collecting the liquid and refeeding it to the spraying unit.

In this context it is further profitable if a detection means is positioned beside the supply unit for detecting the poultry and correspondingly activating the spraying unit or blowing nozzle, respectively. Like this one can attain that the spraying unit or blowing nozzle is only active when a bird is positioned exactly thereabove. On the one hand this means a saving of liquid or gas, whereas on the other hand the surprising effect of spraying or blowing is not lost.

Hereafter the invention will be elucidated further by means of the only figure, which shows schematically an embodiment of an apparatus for carrying out the method according to the invention, using a liquid.

By means of a supply unit 1, which in the shown embodiment comprises a conveyor belt 2 extending around guide rollers 3, the poultry 4 is supplied in a sitting condition in the direction of the arrow. At the foremost end of the conveyor belt 2 the poultry 4 is passed to another conveyor belt 5 which, as is indicated schematically by a dotted line, is permeable for liquid. Immediately below this conveyor belt 5 a spraying unit 6 is positioned, for example a spraying nozzle, which can spray upwardly water or the like through the conveyor belt 5.

The spraying unit 6 is via a pump 7 and a valve 8 connected with a liquid collecting reservoir 9. This collecting reservoir 9 extends below the conveyor belt 5 and the spraying unit 6. Liquid collecting reservoir 9 serves also as a graphical representation of the above-mentioned shallow liquid basin above which poultry 4 may be led, generally as illustrated in the figure.

Further a suspension conveyor comprising transportation shackles 10 is illustrated schematically. Again the direction of transportation of this suspension conveyor is indicated by means of arrows. The empty transportation shackles are supplied in a free suspending state and will eventually rest slidingly on the conveyor belt 5. In this respect it is necessary that the transportation velocity of the suspension conveyor 11 is larger than the transportation velocity of the conveying belt 5, such that the transportation shackles 10 will catch up the poultry on the conveyor belt 5. The transportation shackles 10 are adapted for gripping the legs (preferably the ankle joints) of the poultry 4.

The apparatus functions as follows: when the poultry 4 is passed from the conveyor belt 2 to the conveyor belt 5 it reaches the spraying unit 6, such that the abdomen of the poultry 4 is brought into contact with the liquid stream sprayed by the spraying unit 6. As a result the poultry stands up so that the legs can be correctly engaged by the transportation shackles 10 closing into the poultry 4 from behind. At the end of the conveyor belt 5 the poultry falls backwardly downwards and will be suspended upside-down from the suspension conveyor 11, as represented at the extreme left side in the figure. Next the poultry can be presented for further processing.

Not shown in the figure is a detection means which possibly can be positioned beside and above the conveyor belt 5, for example at a short distance ahead of the spraying unit 6. This detection means detects the passage of a bird sitting on the conveyor belt 5 and activates the spraying unit 6. For this the detection means is connected to the pump 7 and the valve 8 via a control means.

The invention is not restricted to the embodiment described before which can be varied widely within the scope of the invention.

I claim:

1. A method for causing sitting poultry to stand for further processing thereof, said method comprising:
   bringing the abdomen of a bird into contact with a liquid in a fluid contacting area, and with a shallow liquid basin received therebeneath; and
   inverting poultry so caused to stand, including gripping the legs of such poultry which become exposed whenever such poultry stands.

2. A method as set forth in claim 1 wherein said step of bringing the abdomen of a bird into contact with a liquid includes spraying said liquid against the abdomen of said bird.

3. A method as set forth in claim 1 wherein said liquid is water.

4. An apparatus for causing sitting poultry to stand, comprising:
   poultry supplying means for transporting poultry; and
   fluid spraying means associated with said poultry supplying means for spraying a fluid into the abdomen of a bird transported by said poultry supplying means;
   wherein said fluid is a liquid and said apparatus further includes a liquid collecting reservoir positioned below said spraying means for collecting said liquid after being sprayed; and
   further wherein said liquid collecting reservoir further includes means for refeeding said liquid to said spraying means.

5. An apparatus as set forth in claim 4 wherein said spraying means is positioned below said poultry supplying means for spraying said fluid upwardly, said supplying means being permeable by said sprayed fluid such that said fluid is sprayed upwardly through said supplying means onto the abdomen of a bird transported thereon.

6. An apparatus as set forth in claim 4 wherein said fluid is a liquid and said apparatus further includes a liquid collecting reservoir positioned below said spraying means for collecting said liquid after being sprayed.

7. An apparatus as set forth in claim 6 wherein said liquid collecting reservoir further includes means for refeeding said liquid to said spraying means.

8. An apparatus as in claim 4, further including a detection means positioned adjacent said poultry supplying means for detecting the poultry and correspondingly activating said spraying means.

9. An apparatus for causing sitting poultry to stand, comprising:
   poultry supplying means for transporting poultry; and
   fluid spraying means associated with said poultry supplying means for spraying a fluid onto the abdomen of a bird transported by said poultry supplying means; and
   further including a detection means positioned adjacent said poultry supplying means for detecting the poultry and correspondingly activating said spraying means.

10. An apparatus as set forth in claim 9, wherein said spraying means is positioned below said poultry supplying means for spraying said fluid upwardly, said supplying means being permeable by said sprayed fluid such that said fluid is sprayed upwardly through said supplying means onto the abdomen of a bird transported thereon.

11. An apparatus for suspending poultry by the legs for use in poultry processing comprising:
    a first conveying means for transporting thereon a plurality of birds to be processed at a predetermined speed;
    a fluid spraying unit associated with said first conveying means for spraying a fluid onto the underside of each of said birds on said first conveying means such that sitting birds stand and standing birds remain standing such that the legs of all of the birds are exposed;
    a second conveying means for transporting said plurality of birds to be processed, said second conveying means positioned above said first conveying means and operating at a speed exceeding said predetermined speed of said first conveying means;
    a plurality of leg gripping members carried by said second conveying means and associated with said first conveying means along a portion thereof, such that the greater speed of said second conveying means permits individual leg gripping members to catch and grip the exposed legs of individual standing birds carried by said first conveying means, and whereby upon gripping of said exposed legs, each leg gripping member pulls the bird caught thereby from the first conveying means such that the bird falls backwardly downwards and is suspended and carried in an inverted configuration by said leg gripping member along said second conveying means for further processing.

12. An apparatus as set forth in claim 11 wherein said fluid spraying unit is positioned below said first conveying means, and said first conveying means is permeable by said fluid along at least a portion thereof, such that said fluid is sprayable upwardly through said first conveying means onto the underside of each of said birds conveyed thereby.

13. An apparatus as set forth in claim 12 wherein said fluid is water.

14. An apparatus as set forth in claim 13 further including a liquid collecting means positioned beneath said permeable portion of said first conveying means for collecting said water after being sprayed.

15. An apparatus as set forth in claim 14 wherein said liquid collecting reservoir has associated therewith a pump for returning said collected water to said fluid spraying unit.

16. A method for suspending poultry by the legs for use in poultry processing comprising:
    transporting a plurality of birds to be processed to a fluid contacting area;
    exposing the legs of each of said birds by directing a fluid onto the abdomen of each of said birds at said fluid contacting area, thereby causing sitting birds to stand and standing birds to remain standing;
    gripping the legs of each of said birds; and
    inverting said birds into a position of hanging suspension for further processing.

* * * * *